(12) United States Patent
Pelka et al.

(10) Patent No.: US 10,609,879 B2
(45) Date of Patent: Apr. 7, 2020

(54) APPARATUS AND METHOD FOR PREVENTING ANAEROBIC ROOT CONDITIONS

(71) Applicant: Plant Growth Technologies, Inc., Gardena, CA (US)

(72) Inventors: Eric Pelka, Gardena, CA (US); David Gerard Pelka, Los Angeles, CA (US)

(73) Assignee: Plant Growth Technologies, Inc., Gardena, CA (US)

( * ) Notice: Subject to any disclaimer, the term of this patent is extended or adjusted under 35 U.S.C. 154(b) by 0 days.

(21) Appl. No.: 16/162,032

(22) Filed: Oct. 16, 2018

(65) Prior Publication Data

US 2019/0133060 A1  May 9, 2019

Related U.S. Application Data

(60) Provisional application No. 62/582,901, filed on Nov. 7, 2017.

(51) Int. Cl.
*A01G 29/00* (2006.01)
*A01G 9/02* (2018.01)
*A01G 31/02* (2006.01)

(52) U.S. Cl.
CPC ............. *A01G 29/00* (2013.01); *A01G 9/028* (2013.01); *A01G 31/02* (2013.01)

(58) Field of Classification Search
CPC ...... A01G 9/0295; A01G 9/0297; A01G 9/04; A01G 9/045; A01G 31/00; A01G 31/06; A01G 9/028; A01G 31/02; A01G 9/027; A01G 13/0293; A01G 13/0237

USPC .......... 47/86, 87, 66.5, 66.6, 65, 71, 31.1, 64
See application file for complete search history.

(56) References Cited

U.S. PATENT DOCUMENTS

| | | | |
|---|---|---|---|
| 4,312,152 A | 1/1982 | Drudy et al. | |
| 4,505,068 A | 3/1985 | Kaneko | |
| 4,553,352 A | 11/1985 | Powell et al. | |
| 5,581,936 A | 12/1996 | Belgiorno | |
| 6,585,449 B2 * | 7/2003 | Chen ................. | E01C 11/18 404/2 |
| 6,962,464 B1 * | 11/2005 | Chen ................. | E01C 11/226 405/43 |

(Continued)

FOREIGN PATENT DOCUMENTS

| | | |
|---|---|---|
| CN | 202617898 U | 12/2012 |
| CN | 204070035 U | 1/2015 |

(Continued)

OTHER PUBLICATIONS

Website: Bloem; https://www.bloemliving.com/; printed Apr. 15, 2019.

(Continued)

*Primary Examiner* — Trinh T Nguyen
(74) *Attorney, Agent, or Firm* — Knobbe, Martens, Olson & Bear LLP

(57) ABSTRACT

An apparatus is configured to be mechanically coupled to at least one growth substrate. The apparatus includes a frame with a plurality of connecting members and a plurality of insertion anchors. The insertion anchors are configured to be inserted at least partially into the at least one growth substrate and are mechanically coupled to the plurality of connecting members which form one or more openings therebetween.

12 Claims, 14 Drawing Sheets

(56) References Cited

U.S. PATENT DOCUMENTS

| | | | |
|---|---|---|---|
| 7,000,351 B2 | 2/2006 | Baumann | |
| 7,249,440 B2 | 7/2007 | Caron | |
| 7,685,765 B2 | 3/2010 | Stevenson, III | |
| 8,381,440 B1* | 2/2013 | Jabs | A01G 13/0281 47/29.5 |
| 8,950,111 B2 | 2/2015 | Soejima | |
| 9,521,811 B2 | 12/2016 | Peterson et al. | |
| D796,379 S | 9/2017 | Takaoka | |
| 2004/0144026 A1 | 7/2004 | Fan | |
| 2006/0218862 A1* | 10/2006 | Dyas | A01G 9/143 47/86 |
| 2007/0199240 A1* | 8/2007 | Koessler | A01G 13/02 47/31.1 |

FOREIGN PATENT DOCUMENTS

| | | |
|---|---|---|
| CN | 106508654 | 3/2017 |
| EP | 2 139 307 B1 | 3/2011 |
| FR | 2 568 446 | 2/1986 |
| KR | 2003/0063006 A | 7/2003 |

OTHER PUBLICATIONS

Website: FloraFlex; https://floraflex.com/product/6-potpro-pot/; printed Apr. 15, 2019.
Website: Gro Pro; http://www.gro-pro.net/shop/product/gro-pro-nx-level-pot-elevators; dated Apr. 15, 2019.
Website: In Green Company, Surface Saver; http://www.ingreencompany.com/surfacesaver.htm; printed Apr. 15, 2019.
Website: Plant Stand, Inc. Products; http://plantstandinc.com/our-products/; printed Apr. 15, 2019.
Website: Smart Pot; https://smartpots.com/shop/; printed Apr. 15, 2019.
Internation Seacrh Report and Written Opinion received in PCT App No. PCT/US2018/056137, dated May 17, 2019.

* cited by examiner

APPARATUS AND METHOD FOR PREVENTING ANAEROBIC ROOT CONDITIONS

CROSS-REFERENCE TO RELATED APPLICATIONS

This application claims the benefit of priority to U.S. Provisional Appl. No. 62/582,901 filed Nov. 7, 2017 which is incorporated in its entirety by reference herein.

BACKGROUND

Field

The present application is generally directed to systems and methods of optimizing plant growth, and more specifically, to structural elements configured to facilitate root oxygenation and aerobic root growth.

Description of the Related Art

Hydroponic horticulture is a fast-growing industry that includes the production of flowering plants, vegetables, and other flora, typically indoors. One reason for growth of the industry is the introduction of plant growth technologies such as light emitting diodes (LEDs) with tuned spectral emission, high intensity discharge lighting (HID), and other energy efficient artificial lighting capable of reducing energy consumption by up to 33%. Another reason for growth in the industry generally has been the ongoing development of nutrient-enriched growth substrates (e.g., growth blocks; growth slabs; growth cubes), commonly made from mineral fibers and/or organic materials infused with nutrients, that act as soil replacements. Many hydroponic horticulturists have embraced using these growth substrates to aid in expedited plant growth.

SUMMARY

Certain embodiments provide an apparatus configured to be mechanically coupled to at least one growth substrate. The apparatus comprises a frame comprising a plurality of connecting members. The apparatus further comprises a plurality of insertion anchors configured to be inserted at least partially into the at least one growth substrate. The insertion anchors are mechanically coupled to the plurality of connecting members which form one or more openings therebetween.

Certain embodiments described herein provide a stack of apparatuses configured to be mechanically coupled to at least one growth substrate. The stack comprises a first apparatus configured to be mechanically coupled to the at least one growth substrate, the first apparatus comprising a first plurality of first insertion anchors and a plurality of first recesses. The stack further comprises a second apparatus configured to be mechanically coupled to the at least one growth substrate, the second apparatus comprising a second plurality of second insertion anchors and a plurality of second recesses. The first apparatus and the second apparatus are stacked with one another such that the second insertion anchors extend into the first recesses.

Certain embodiments described herein provide a method. The method comprises providing a plurality of apparatuses configured to be mechanically coupled to at least one growth substrate. The plurality of apparatuses comprises a first apparatus comprising a first plurality of first insertion anchors and a plurality of first recesses. The plurality of apparatuses further comprises a second apparatus comprising a second plurality of second insertion anchors and a plurality of second recesses. The first and second apparatuses are configured to be mechanically coupled to the at least one growth substrate. The method further comprises stacking the first apparatus and the second apparatus together such that the second insertion anchors protrude into the first recesses.

BRIEF DESCRIPTION OF THE DRAWINGS

Embodiments are described herein in conjunction with the accompanying drawings, in which.

DETAILED DESCRIPTION

Figure 1A:
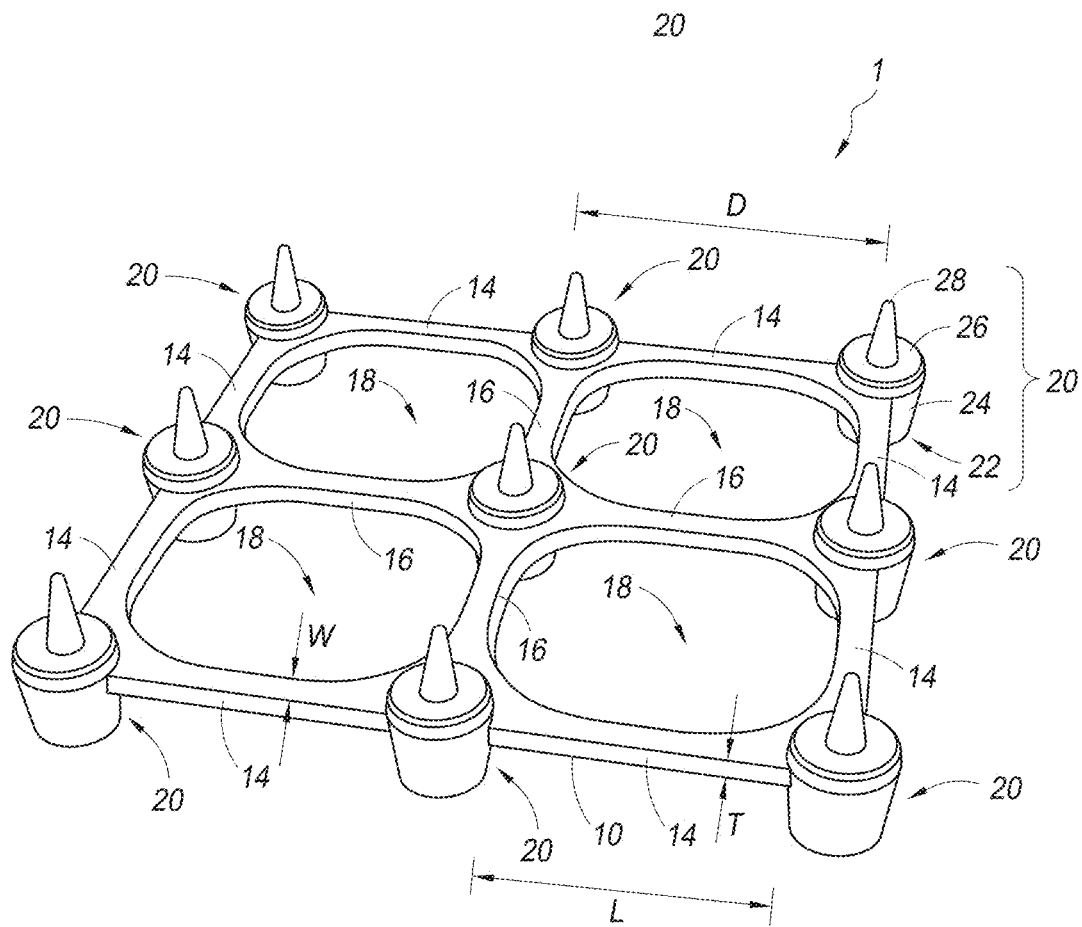
FIG. 1A is a perspective view of a top side of an example apparatus configured to be mechanically coupled to at least one growth substrate in accordance with certain embodiments described herein.

While growth substrates (e.g., growth blocks; growth slabs; growth cubes) are effective for providing plants with supplemental nutrients, they can be problematic for root oxygenation and aerobic root growth. For example, the manner in which the growth substrates are situated during plant growth can inhibit aerobic respiration of the roots (e.g., reducing exposure of the roots to oxygen, thereby diminishing or depleting oxygen intake for the process of breaking down nutrients by which to receive energy), leading to undesirable anaerobic root growth.

For example, growth substrates have previously been situated on flat, nonporous, storage trays, typically made of plastic or the like. These trays may be square or rectangular in shape with opposing side walls. Because roots inherently grow downward through the growth substrate, eventually making contact with the nonporous storage tray, using such storage trays can be problematic. Once the roots make contact with the tray, the ends of the roots may be submerged in excess water due to overwatering the growth substrate, or may otherwise be deprived of oxygen. While other trays have multiple holes placed on the bottom of the tray, such trays do not prevent the roots from making direct contact with the solid bottom portion of the storage tray.

Certain embodiments described herein provide a frame-like apparatus that separates (e.g., suspends) the growth substrate from the underlying storage tray, thereby advantageously inhibiting (e.g., preventing) the roots from directly contacting the underlying storage tray and/or facilitating oxygenation of the roots for aerobic respiration and achieving optimal growth conditions. In certain embodiments, the apparatus comprises one or more insertion anchors (e.g., spikes; fins; protrusions) placed along or throughout the frame and which are configured to penetrate (e.g., puncture) a bottom surface of the growth substrate to facilitate (e.g., ensure) (i) appropriate oxygenation to the plant's root system (e.g., by aerating the growth substrate, alleviating compaction, and allowing oxygen to penetrate the plant's root system) and/or (ii) water drainage from the growth substrate. In certain embodiments, the apparatus further comprises one or more supports (e.g., pegs; offsets) placed along or throughout the frame (e.g., coincident with the insertion anchors) which are configured to separate a large fraction of the bottom surface area of the growth substrate from the apparatus and/or the underlying storage tray.

Conventional growth systems place the growth substrates directly onto structured (e.g., corrugated) surfaces (e.g., light diffuser grids) which separate the growth substrate from an underlying flat surface (e.g., tray), ostensibly to provide an air gap between the growth substrate and the underlying flat surface. In addition, these structured surfaces have regions (e.g., recesses between corrugations) which are ostensibly used as drainage channels to help divert water away from the bottom surface of the growth substrate and the growing plant. However, these regions are relatively small and do not allow water to properly drain (e.g., drainage is inhibited by capillary action). In addition, it can be difficult to pull the growth substrate from the structured surface due to an adhesive force created by the excess water between the growth substrate and the structured surface. Further, such structured surfaces can be difficult to clean and/or disinfect for subsequent repeated use (e.g., by scrubbing the small regions, recesses, and/or other structures with a small brush).

In contrast, certain embodiments described herein can be placed between the growth substrate and the underlying flat surface (e.g., tray), in place of a conventional structured surface. Certain embodiments described herein advantageously facilitate water drainage from the growth substrates (e.g., the insertion anchors advantageously wick water away from the growth substrate and the large open areas below the growth substrate allow this water to drain away) that is improved as compared to conventional structured surfaces. Thus, certain embodiments described herein advantageously allow less water to be used to achieve optimal growth conditions and/or reduce (e.g., inhibit) the occurrence of excessively soggy growth substrates and pythium ("root rot") caused by roots that are not properly drained (e.g., in stagnant water). Certain embodiments allow the growth substrate to become dryer (e.g., to reach an optimum water-to-air ratio) and facilitating a faster growing plant. By spacing the growth substrate away from the underlying flat surface and facilitating proper water drainage, certain embodiments described herein advantageously achieve an active, healthy root system searching for more water. Certain embodiments described herein also advantageously make cleaning, disinfecting, and/or sterilizing the apparatus easier by reducing (e.g., avoiding) the small regions, recesses, and/or other structures of conventional systems.

Certain embodiments described herein are compatible with various growth substrates having various dimensions and growth media. Example growth substrates in accordance with certain embodiments described herein include, but are not limited to, mineral wool (e.g., available from Rockwool International A/S of Hedehusene, Denmark under the tradenames Grodan® and Pargro®), coconut coir (sometimes referred to as "coco coir")(e.g., available from Char Coir, Inc. of Los Angeles, Calif.), and fabric pots or fabric containers for growing plants available from High Caliper Growing, Inc. of Oklahoma City, Okla. under the tradename "Smart Pot®." Certain embodiments described herein are compatible with growth substrates that are cube-shaped, parallelepiped-shaped, prism-shaped, circularly-cylindrical-shaped, polygonal-cylindrical-shaped, or have other geometric or non-geometric shapes. Certain embodiments described herein are compatible with growth substrates that have bottom sides that are circular-shaped (e.g., having a 1.5" diameter; 7" diameter; diameter in a range of 7 inches to 38 inches), square-shaped (e.g., 1.47"×1.47"; 1.57"× 1.57"; 1.97"×1.97"; 2"×2"; 3"×3"; 4"×4"; 6"×6"; 8"×8"), rectangular-shaped, or have other geometric or non-geometric shapes and sizes.

Figure 1B:
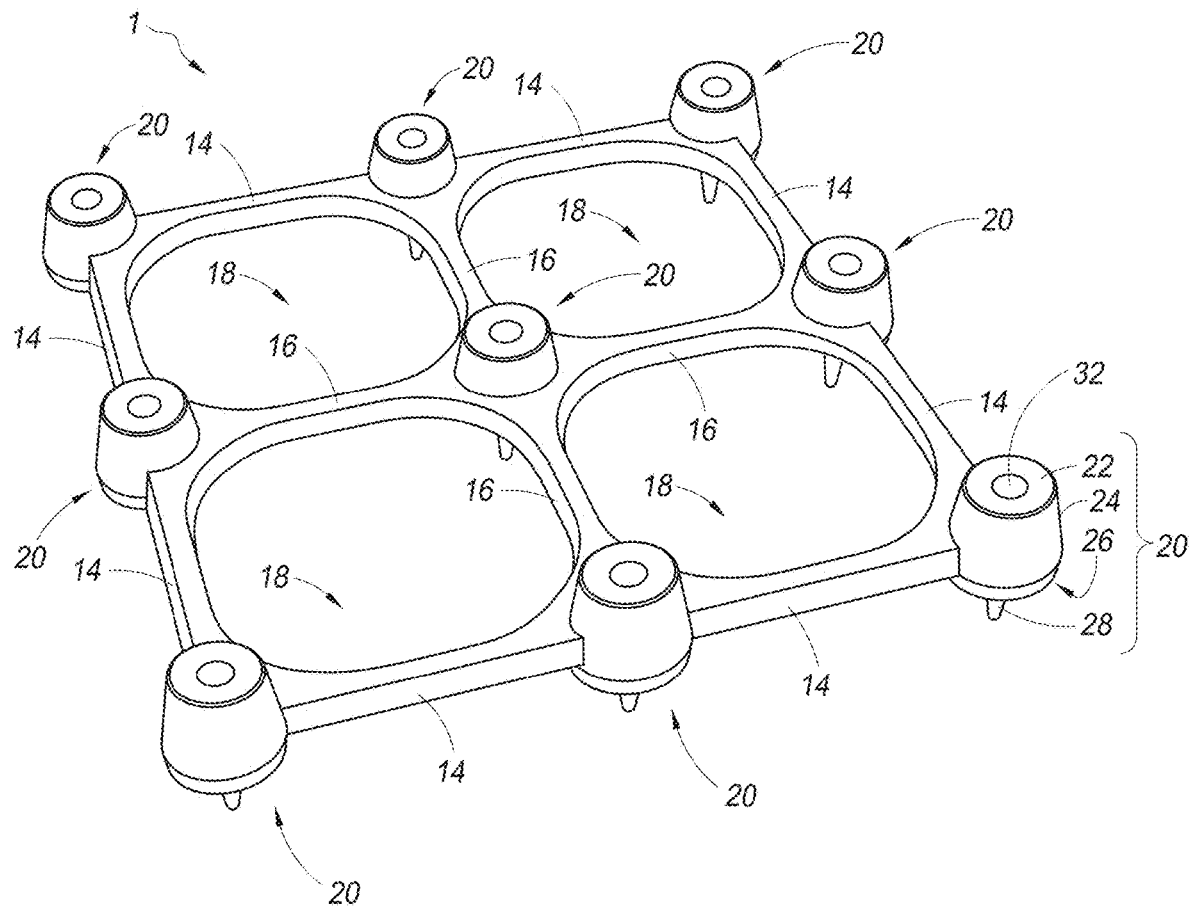
FIG. 1B is a perspective view of a bottom side of the example apparatus of FIG. 1A.

FIG. 1A schematically illustrates a perspective view of a top side of an example apparatus 1 configured to be mechanically coupled to at least one growth substrate (not shown) in accordance with certain embodiments described herein. FIG. 1B is a perspective view of a bottom side of the example apparatus of FIG. 1A. The apparatus 1 comprises a frame 10 comprising a plurality of connecting members 14, 16. The apparatus 1 further comprises a plurality of insertion anchors 28 (e.g., components of a plurality of aeration portions 20) configured to be inserted at least partially into the at least one growth substrate (e.g., configured to penetrate or puncture a bottom surface of the at least one growth substrate). The insertion anchors 28 are mechanically coupled to the plurality of connecting members 14, 16 (e.g., via other components of the aeration portions 20) which form one or more openings 18 therebetween.

In certain embodiments, the apparatus 1 (e.g., the frame 10, including the connecting members 14, 16, the insertion anchors 28, and the other components of the aeration portions 20) is made from one or more sufficiently durable, resilient, and moldable materials or combination of materials. For example, the insertion anchors 28 comprise one or more materials having sufficient rigidity to puncture a bottom surface of the growth substrate. Example materials compatible with certain embodiments described herein include, but are not limited to: plastic (e.g., non-porous, food-grade, BPA-free, sterilizable), cellulose-based material, plant fiber-based material, sucrose-based material. In certain embodiments, the one or more materials are non-porous (e.g., washable to facilitate cleaning, disinfecting, and/or sterilizing for repeated use), while in certain other embodiments, the one or more materials are biodegradable, recyclable, or otherwise configured to be disposable after a finite number of uses (e.g., after a single use). In certain embodiments, the frame 10 and the plurality of aeration portions 20 are components of a single, unitary structure (e.g., a plastic structure that is formed by injection molding).

In certain embodiments, the apparatus 1 has a geometrically-shaped outer perimeter (e.g., circular; square; rectangular; triangular; hexagonal; polygonal), while in certain other embodiments, the outer perimeter of the apparatus 1 is non-geometrically-shaped. In certain embodiments, the outer perimeter of the apparatus 1 is sized to generally match (e.g., within ±10%; within ±5%) the dimensions of the bottom side of a single growth substrate with which the apparatus 1 is configured to be used. For example, the outer perimeter of the apparatus 1 of the example apparatus 1 of FIGS. 1A and 1B is square-shaped and generally matches (e.g., within ±10%; within ±5%) the dimensions of an outer perimeter of a square bottom side (e.g., 6"×6") of a single growth substrate. In certain other embodiments, the outer perimeter of the apparatus 1 is sized to generally match (e.g., within ±10%; within ±5%) the dimensions of a plurality of growth substrates with which the apparatus 1 is configured to be used. For example, the outer perimeter of the apparatus 1 can generally match (e.g., within ±10%; within ±5%) the dimensions of an outer perimeter of the cumulative bottom sides of 2, 3, 4, or more growth substrates that are adjacent to one another (e.g., 6"×36" which can be used with a linear array of six 6"×6" growth substrates; 12"×12" which can be used with a two-dimensional array of four 6"×6" growth substrates).

In certain embodiments, the frame 10 comprises a plurality of outer connecting members 14 (e.g., elongate portions that at least partially define the outer perimeter of the apparatus 1) and a plurality of inner connecting members 16 (e.g., elongate portions that are within the outer perimeter of the apparatus 1). The outer connecting members 14 and the inner connecting members 16 can each comprise one or more straight (e.g., flat) surfaces and/or one or more curved surfaces, and can each comprise a straight profile or a curved profile. In certain embodiments, at least one (e.g., some or all) of the connecting members 14, 16 has a uniform cross-section (e.g., in a plane perpendicular to its length), while in certain embodiments, at least one (e.g., some or all) of the connecting members 14, 16 has a non-uniform cross-section (e.g., in a plane perpendicular to its length) which varies along its length. In certain embodiments, each outer connecting member 14 and each inner connecting member 16 terminates at, and is connected to, two corresponding aeration portions 20 (e.g., each of the two ends of the connecting member 14, 16 terminates at, and is connected to, a corresponding one of the aeration portions 20).

In certain embodiments, the connecting members 14, 16 are arranged in a repeating or geometric pattern, forming a corresponding pattern of the one or more openings 18 and of the aeration portions 20. For example, as shown in FIGS. 1A and 1B, the frame 10 comprises eight outer connecting members 14 and four inner connecting members 16 which are mechanically coupled to nine insertion anchors 28 (e.g., via nine aeration portions 20) arranged in a rectangular (e.g., square) pattern with four rectangular (e.g., square) openings 18. In other examples, the frame 10 can comprise four outer connecting members 14 (e.g., with no inner connecting members 16) mechanically coupled to four insertion anchors 28 (e.g., via four aeration portions 20) arranged in a rectangular (e.g., square) pattern with a single, unitary opening 18. In still other embodiments, the connecting members 14, 16 are arranged in a circular pattern (e.g., circularly-symmetric) with at least some of the outer connecting members 14 comprising circular arc segments, at least some of the inner connecting members 16 comprising radial segments, and a number of insertion anchors 28 distributed between or over the connecting members 14, 16.

In certain embodiments, each connecting member 14, 16 has length L (e.g., along a first direction generally parallel to a plane defined by the connecting members 14, 16) in a range of 0.5 inch to 8 inches, in a range of 1 inch to 6 inches, in a range of 1 inch to 4 inches, or in a range of 2 inches to 4 inches. In certain embodiments, the aeration portions 20 are spaced from one another by a center-to-center distance D in a range of 1 inch to 8 inches, in a range of 1 inch to 6 inches, in a range of 1 inch to 4 inches, or in a range of 2 inches to 4 inches. In certain embodiments, each connecting member 14, 16 has a width W (e.g., along a second direction generally parallel to the plane defined by the connecting members 14, 16 and generally perpendicular to the first direction) in a range of 0.0625 inch to 3 inches, in a range of 0.125 inch to 3 inches, or in a range of 0.25 inch to 2 inches. In certain embodiments, each connecting member 14, 16 has a thickness T (e.g., along a third direction generally perpendicular to the plane defined by the connecting members 14, 16) in a range of 0.0625 inch to 1 inch, in a range of 0.125 inch to 1 inch, or in a range of 0.125 inch to 0.75 inch.

In certain embodiments, multiple insertion anchors 28 (e.g., as components of multiple aeration portions 20) are located along the outer perimeter of the apparatus 1. As schematically illustrated in FIGS. 1 and 2, each aeration portion 20 along an outer side of the example apparatus 1 has two outer connecting members 14 extending therefrom at 180 degrees from one another and one inner connecting member 16 extending therefrom at 90 degrees from each of the two outer connecting members 14. Each aeration portion 20 at a corner of the example apparatus 1 has two outer connecting members 14 extending therefrom at 90 degrees from one another, and the aeration portion 20 spaced from the outer perimeter of the example apparatus 1 (e.g., at the center of the frame 10) has four inner connecting members 16 extending therefrom at 90 degrees from one another.

In certain embodiments, the openings 18 defined by the connecting members 14, 16 and the aeration portions 20 have substantially the same shape and size as one another, while in certain other embodiments, two or more of the openings 18 have different shapes and/or sizes from one another. The openings 18 of certain embodiments have an area in a plane defined by the connecting members 14, 16 in a range of 1 in$^2$ to 64 in$^2$, in a range of 4 in$^2$ to 36 in$^2$, in a range of 9 in$^2$ to 25 in$^2$, or in a range of 9 in$^2$ to 16 in$^2$. In certain embodiments, the one or more openings 18 are configured to not inhibit oxygen from reaching roots at the bottom side of the growth substrate (e.g., to not prevent oxygen from reaching the roots; to allow oxygen to reach the roots) and/or to prevent (e.g., inhibit) the roots at the bottom side of the at least one growth substrate directly above the one or more openings 18 from contacting a surface of the apparatus 1.

In certain embodiments, some or all of the insertion anchors 28 are located at the corners of the apparatus 1 (e.g., as schematically illustrated by FIGS. 1A, 1B, 2A, and 2B), and in certain embodiments, some or all of the insertion anchors 28 are located along the outer perimeter of the apparatus 1 (e.g., as schematically illustrated by FIGS. 1A, 1B, 2A, and 2B). Certain embodiments have some or all of the insertion anchors 28 between or over the outer connecting members 14, between or over the inner connecting members 16, and/or within the interior of the frame 10. While FIGS. 1A-1D and 2A-2B schematically illustrate an example embodiment with straight connecting members 14, 16 that are substantially the same length as one another, arranged in a rectangular pattern, other configurations and patterns of the connecting members 14, 16 (e.g., triangular; hexagonal; polygonal; circular; non-geometrical; curved connecting members; connecting members with different lengths) are also compatible with certain embodiments described herein.

In certain embodiments, as schematically illustrated by FIGS. 1A-1D and 2A-2B, at least one (e.g., some or all) of the aeration portions 20 comprises a bottom portion 22, a sidewall portion 24, a top portion 26, and at least one insertion anchor 28 extending from the top portion 26 (e.g., perpendicularly from a top plane of the top portion 26). In certain embodiments, the bottom portion 22 defines a bottom plane and is configured to rest on an underlying surface during use of the apparatus 1, and the top portion 26 (e.g., excluding the at least one insertion anchor 28) defines a top plane and is configured to support a bottom side of the growth substrate. In certain embodiments, the sidewall portion 24 has a height H (e.g., from the bottom plane defined by the bottom portion 22 to the top plane defined by the top portion 26). For example, the height $H_A$ (e.g., in a direction generally perpendicular to the plane defined by the connection members 14, 16) can be in a range of 0.25 inch to 3 inches, in a range of 0.25 inch to 2 inches, or in a range of 0.5 inch to 1.5 inches.

In certain embodiments, the sidewall portion 24 has a circular cross-section in a plane perpendicular to the height. Other cross-sectional shapes in the plane perpendicular to the height (e.g., rectangular; square; triangular; hexagonal; polygonal; non-geometrical) are also compatible with certain embodiments described herein. The sidewall portion 24 of certain embodiments has an outer perimeter (e.g., circumference) which varies along the height of the sidewall portion 24 (e.g., is larger near the top portion 26 and is smaller near the bottom portion 22), while in certain other embodiments, the outer perimeter (e.g., circumference) of the sidewall portion 24 is uniform along the height of the sidewall portion 24. In certain embodiments, the aeration portion 20 (e.g., excluding the insertion anchor 28) is substantially barrel-shaped, while other shapes (e.g., cylindrical; parallelepiped; cubic) are also compatible with certain embodiments described herein. For example, the aeration portion 20 can have a width $W_A$ (e.g., in a direction generally parallel to the plane defined by the connection members 14, 16) in a range of 0.25 inch to 3 inches, in a range of 0.25 inch to 2 inches, or in a range of 0.5 inch to 1 inch.

In certain embodiments, the top portion 26 of the aeration portion 20 is configured to support the at least one growth substrate 36 and is spaced above the connecting members 14, 16 by a first gap distance $G_1$. The first gap distance $G_1$ of certain embodiments is configured to allow oxygen to reach the bottom surface of the growth medium and/or to inhibit (e.g., prevent) the roots from being submerged in stagnant water. For example, the first gap distance $G_1$ can be in a range of 0.0625 inch to 1 inch, in a range of 0.125 inch to 0.5 inch, or in a range of 0.25 inch to 0.5 inch. In certain embodiments, the bottom portion 22 of the aeration portion 20 is spaced below the connecting members 14, 16 by a second gap distance $G_2$. The second gap distance $G_2$ of certain embodiments is configured to allow water to drain away from the growth substrate and the apparatus 1. For example, the second gap distance $G_2$ can be in a range of 0.0625 inch to 1 inch, in a range of 0.125 inch to 0.5 inch, or in a range of 0.25 inch to 0.5 inch. In certain embodiments, the second gap distance $G_2$ is equal to zero (see, e.g., FIGS. 2A-2B) and the apparatus 1 is configured to allow water to drain away from the growth substrate and the apparatus 1 through the space between the top portion 26 and the connecting members 14, 16.

Figure 1C:
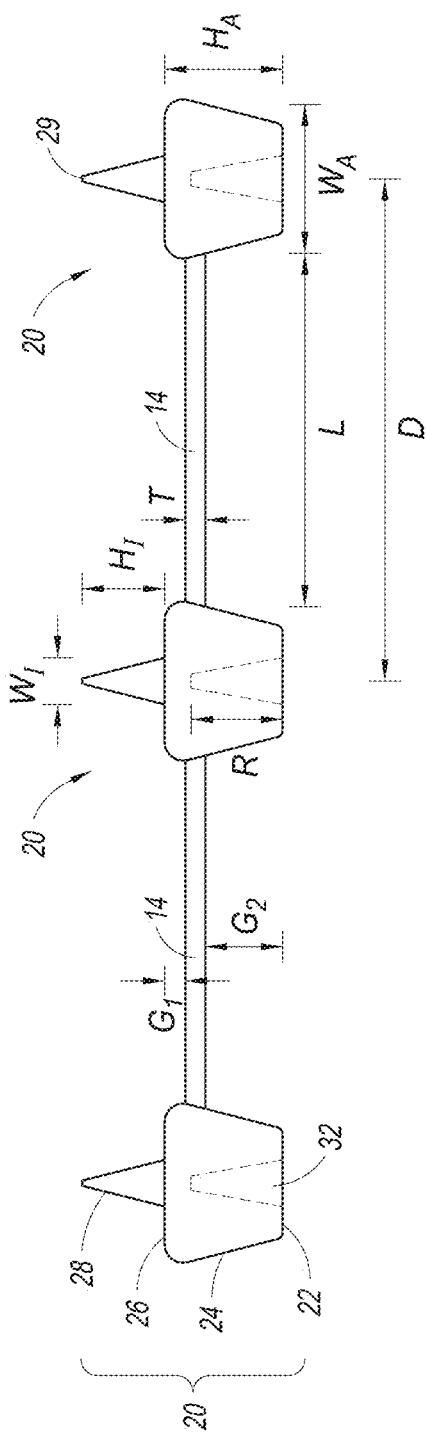
FIG. 1C is a side view of the example apparatus of FIGS. 1A and 1B.
Figure 1D:
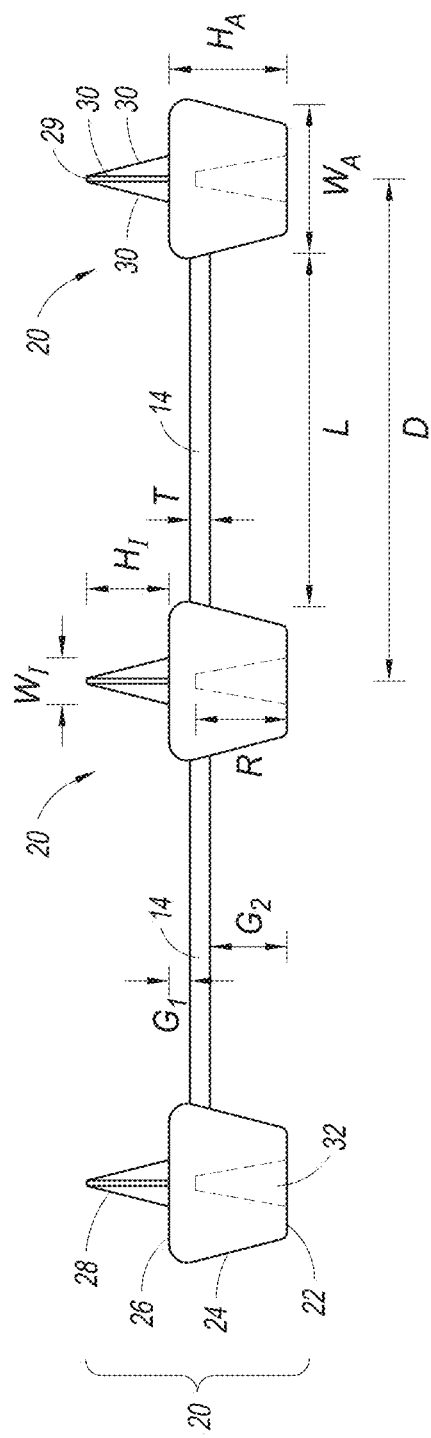
FIG. 1D is a side view of another example apparatus in accordance with certain embodiments described herein.

In certain embodiments, the top surface of the top portion 26 of the aeration portion 20 is substantially flat (e.g., excluding the at least one insertion anchor 28). The aeration portion 20 of certain embodiments is rounded between the sidewall portion 24 and the top portion 26 to create a shoulder-like structure on which the growth substrate can rest. In certain embodiments, as schematically illustrated by FIGS. 1C and 1D, the insertion anchor 28 has an end 29 configured to be inserted into the growth substrate (e.g., the end 29 is narrowed or pointed). For example, the end 29 can be configured to penetrate or puncture a bottom surface of the growth substrate upon being pressed (e.g., manually) against the bottom surface. In certain embodiments, the extent of the insertion can be controlled by adjusting the amount of force with which the insertion anchor 28 is pressed against the bottom surface. The insertion anchor 28 of certain embodiments comprises one or more fins 30 (e.g., four fins forming a cross-shaped profile), as schematically illustrated in FIG. 1D, which is configured to promote ease of insertion into the growth substrate as well as to secure anchorage therein. For example, the insertion anchor 28 can have a height $H_I$ (e.g., in a direction generally perpendicular to the top portion 26) in a range of 0.25 inch to 3 inches, in a range of 0.5 inch to 2 inches, or in a range of 0.5 inch to 1.5 inches, and can have a width $W_I$ in a range of 0.125 inch to 1 inch, in a range of 0.25 inch to 0.75 inch, or in a range of 0.25 inch to 0.75 inch.

In certain embodiments, the apparatus 1 comprises a plurality of regions 32 configured to receive the insertion anchors 28 of another apparatus 1' when the two apparatuses 1, 1' are stacked with one another. For example, as schematically shown in FIGS. 1B-1D, the bottom portion 22 of the aeration portion 20 can comprise at least one region 32 (e.g., recess; concave opening) extending into the aeration portion 20 and configured to receive the at least one insertion anchor 28 of another apparatus 1' when the two apparatuses 1, 1' are stacked with one another. For example, as schematically illustrated by FIGS. 1B-1D, each aeration portion 20 of the apparatus 1 comprises a pointed insertion anchor 28 and the at least one region 32 has a shape (e.g., cone-shaped) configured to receive a corresponding insertion anchor 28' of another apparatus 1' such that the top portion 26' of the aeration portion 20' of the other apparatus 1' contacts the bottom portion 22 of the corresponding aeration portion 20 of the apparatus 1. For example, the depth R of the at least one region 32 can be equal to or greater than the height $H_I$ of the insertion anchor 28 and/or the width of the at least one region 32 can be equal to or greater than the width $W_I$ of the insertion anchor 28. In certain embodiments, the insertion anchor 28' of the lower apparatus 1' does not fully fit into the corresponding region 32 of the upper apparatus 1 (e.g., the depth R of the at least one region 32 is less than the height $H_I$ of the insertion anchor 28 and/or the width of the at least one region 32 is less than the width $W_I$ of the insertion anchor 28).

Figure 2A:
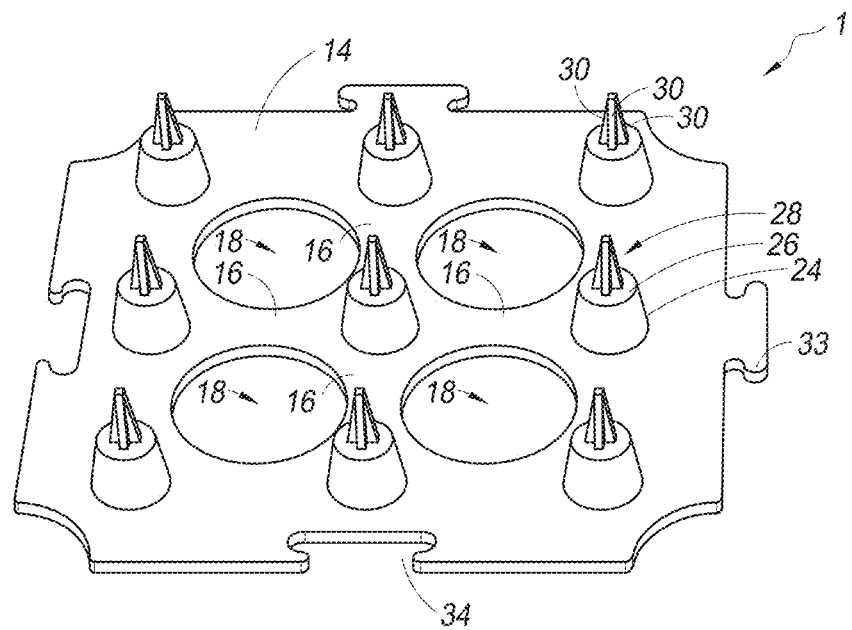
FIGS. 2A and 2B are perspective views of a top side and a bottom side, respectively, of another example apparatus in accordance with certain embodiments described herein.
Figure 2B:
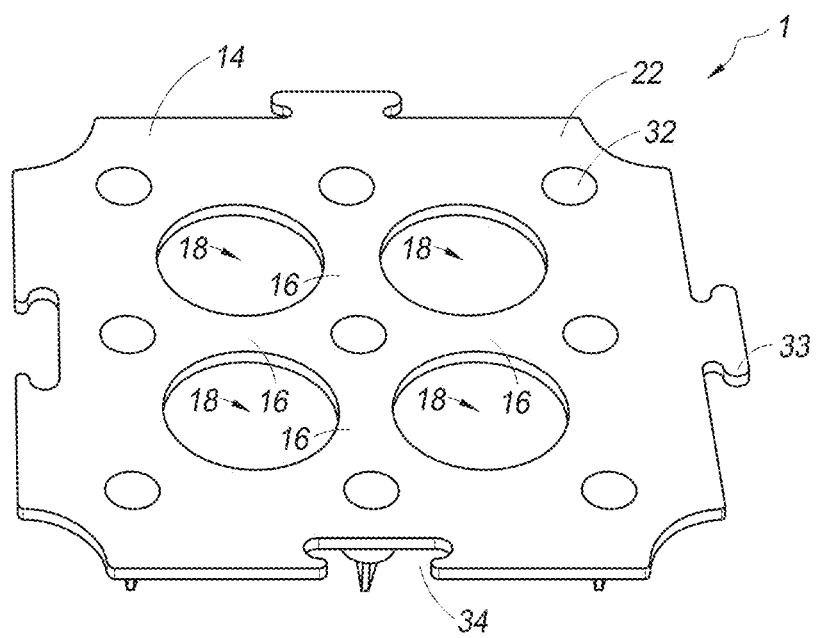

FIGS. 2A and 2B are perspective views of a top side and a bottom side, respectively, of another example apparatus 1 in accordance with certain embodiments described herein. The connecting members 14, 16 have non-uniform widths and define generally circular openings 18 (e.g., in contrast to the generally rectangular or square openings 18 schematically illustrated in FIGS. 1A-1B). In the example apparatus 1 of FIGS. 2A and 2B, the aeration portions 20 comprise cross-shaped insertion anchors 28 each having four fins 30 and have bottom portions 22 that are coincident with a bottom surface of the connecting members 14, 16 (e.g., a second gap distance $G_2$ equal to zero).

Figure 2C:
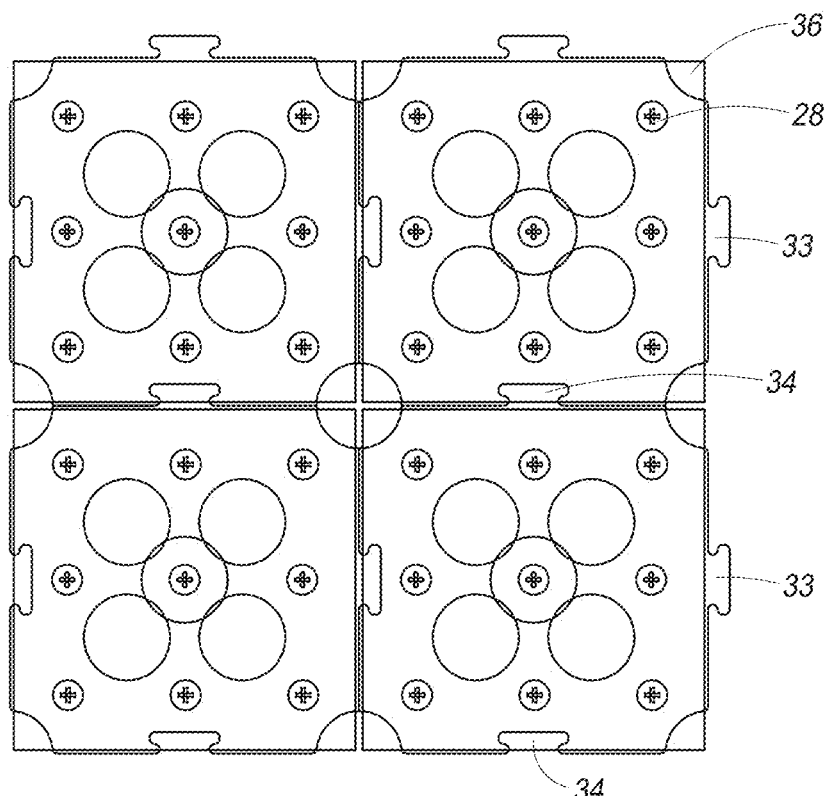
FIG. 2C schematically illustrates a set of four example apparatuses extending over a 12"×12" area and used with four growth substrates (in a 2×2 array), each having a 6"×6" square bottom surface, in accordance with certain embodiments described herein.
Figure 2D:
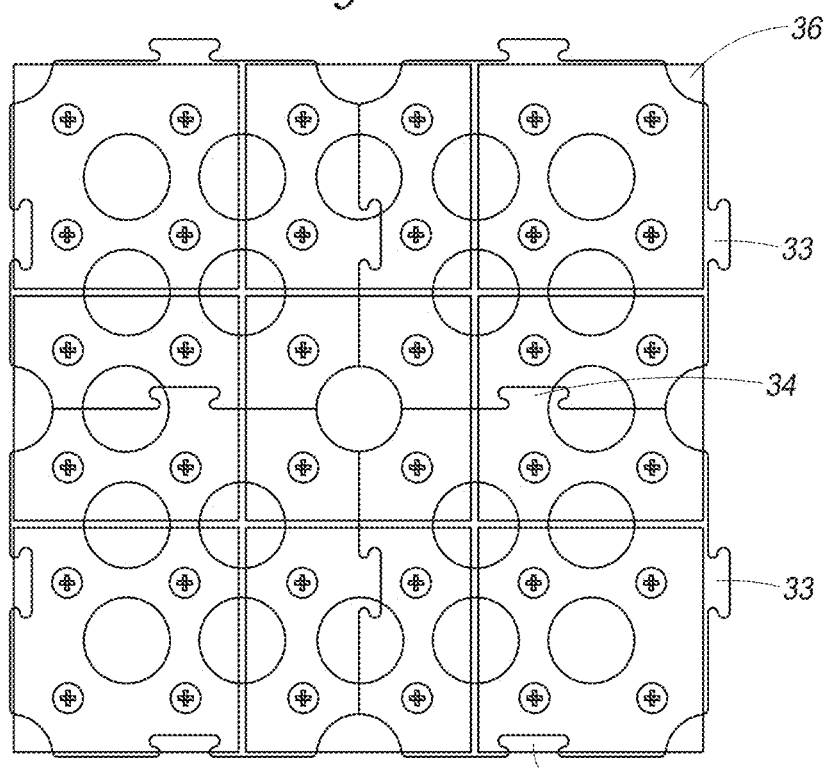
FIG. 2D schematically illustrates the set of four example apparatuses of FIG. 2C extending over a 12"×12" area and used with nine growth substrates (in a 3×3 array), each having a 4"×4" square bottom surface, in accordance with certain embodiments described herein.

The example apparatus 1 of FIGS. 2A and 2B further comprises one or more protrusions 33 (e.g., tabs) and one or more recesses 34 in accordance with certain embodiments described herein. The protrusions 33 can be configured to mate with one or more recesses 34' of adjacent apparatuses 1' and the one or more recesses 34 can be configured to mate (e.g., interlock) with one or more protrusions 33' of adjacent apparatuses 1'. For example, the protrusions 33 and recesses 34 can advantageously provide structural stability when the apparatus 1 is a member of a group of adjacent apparatuses 1. FIGS. 2C and 2D schematically illustrate configurations in which four example apparatuses 1 are mechanically coupled together (e.g., by mating protrusions 33 and recesses 34) in accordance with certain embodiments described herein. FIG. 2C schematically illustrates a set of four example apparatuses 1 extending over a 12"×12" area and used with four growth substrates 36 (in a 2×2 array) (shown by the shaded areas), each having a 6"×6" square bottom surface, in accordance with certain embodiments described herein. Each of the growth substrates 36 of FIG. 2C has nine insertion anchors 28 inserted into the bottom surface of the growth substrate 36. FIG. 2D schematically illustrates the set of four example apparatuses 1 of FIG. 2C extending over a 12"×12" area and used with nine growth substrates 36 (in a 3×3 array) (shown by the shaded areas), each having a 4"×4" square bottom surface, in accordance with certain embodiments described herein. Each of the growth substrates 36 of FIG. 2D has four insertion anchors 28 inserted into the bottom surface of the growth substrate 36.

Figure 3A:
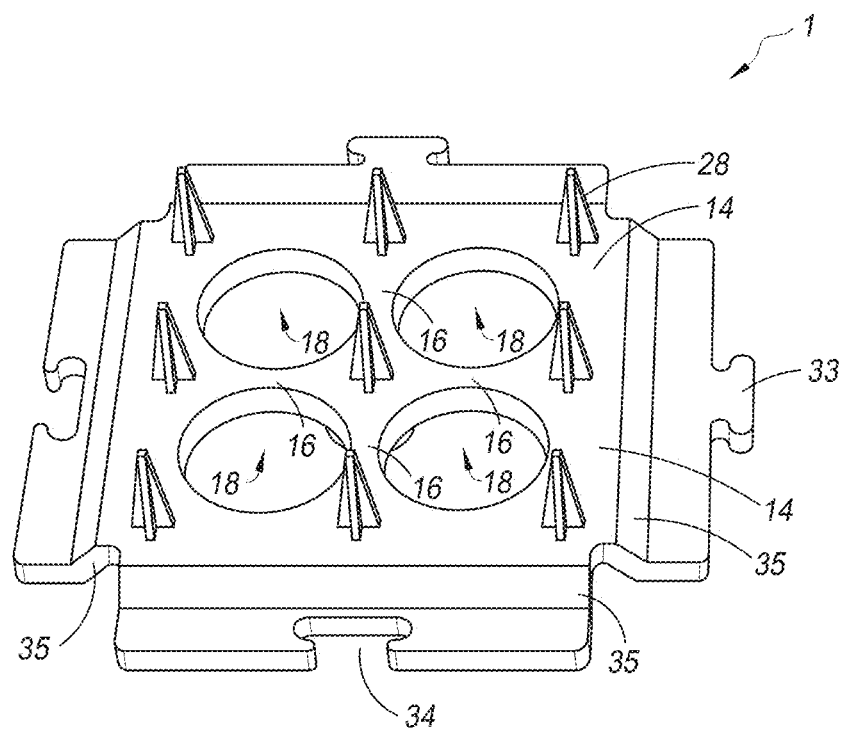
FIGS. 3A and 3B are perspective top and bottom views, respectively, of another example apparatus in accordance with certain embodiments described herein.
Figure 3B:
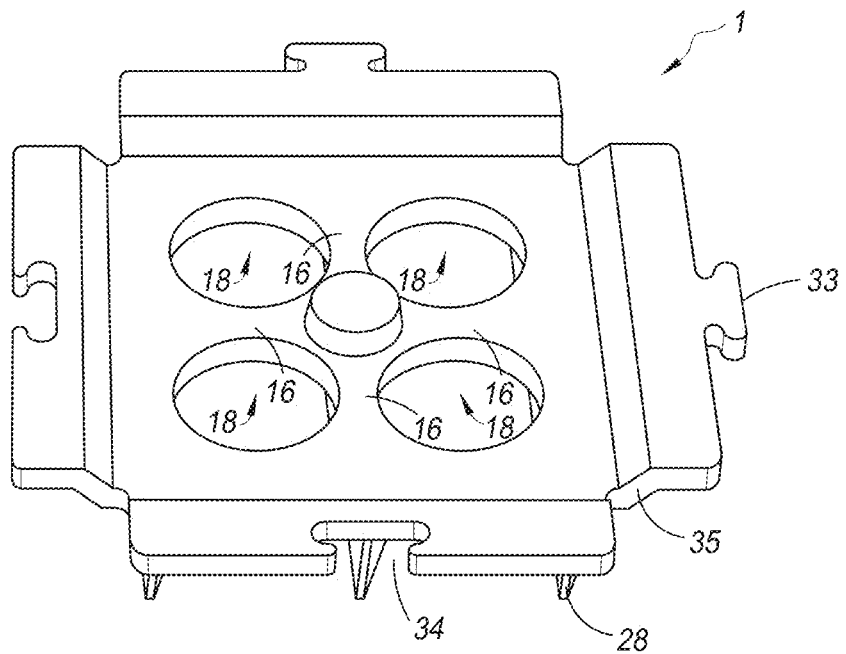
Figure 3C:
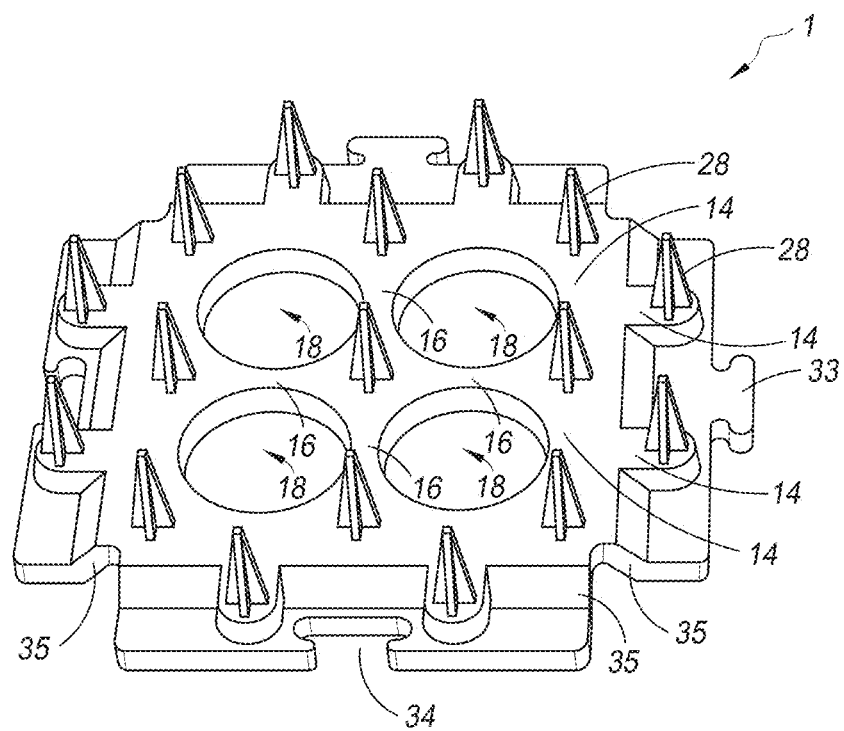
FIGS. 3C and 3D are perspective top and bottom views, respectively, of still another example apparatus in accordance with certain embodiments described herein.
Figure 3D:
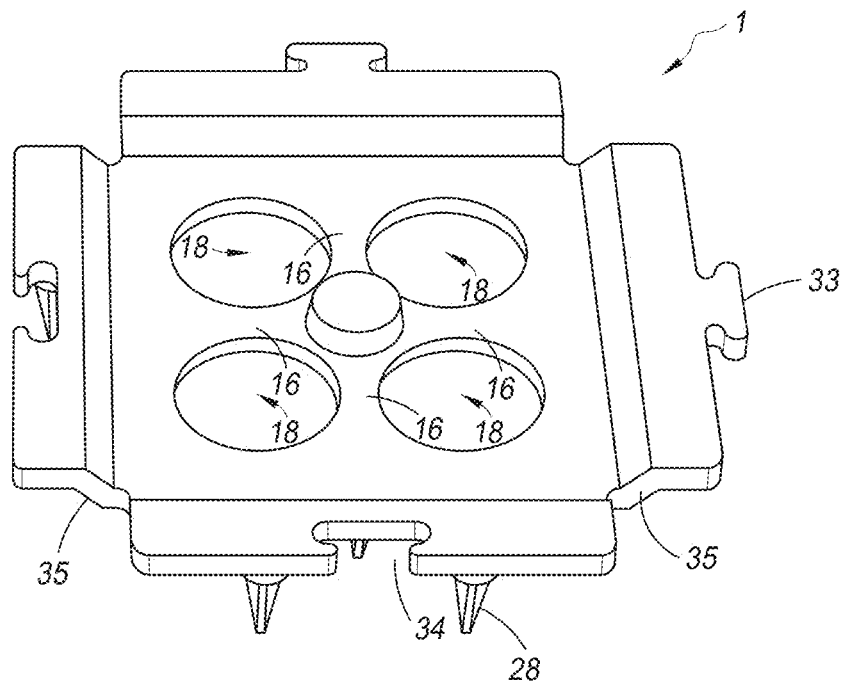

FIGS. 3A and 3B are perspective top and bottom views, respectively, of another example apparatus 1 in accordance with certain embodiments described herein. FIGS. 3C and 3D are perspective top and bottom views, respectively, of still another example apparatus in accordance with certain embodiments described herein. The example apparatus 1 of FIGS. 3A and 3B and the example apparatus 1 of FIGS. 3C and 3D do not comprise the sidewall portions 24 of the aeration portions 20 of the apparatus 1 of FIGS. 1A-1D and 2A-2B, but do include cross-shaped insertion anchors 28. When mechanically coupled to the one or more growth substrates 36, the insertion anchors 28 can be inserted partially into the bottom surface of the one or more growth substrates 36, leaving a gap between the bottom surface of the growth substrate 36 and the underlying top surface of the connecting member 14, 16, thereby providing a pathway for oxygen to the roots and for water draining from the growth substrate 36. As schematically illustrated by FIGS. 3A-3D, the apparatus 1 can further comprise protrusions 33, recesses 34, and portions 35 which are shaped (e.g., stepped) to have the bottom surfaces of the connecting members 14, 16 spaced above the underlying surface on which the apparatus 1 is positioned, thereby facilitating water drainage away from the growth substrate and the apparatus 1. In the example apparatus 1 of FIGS. 3C and 3D, at least some of the connecting members 14 extend over the portions 35.

Figure 4A:
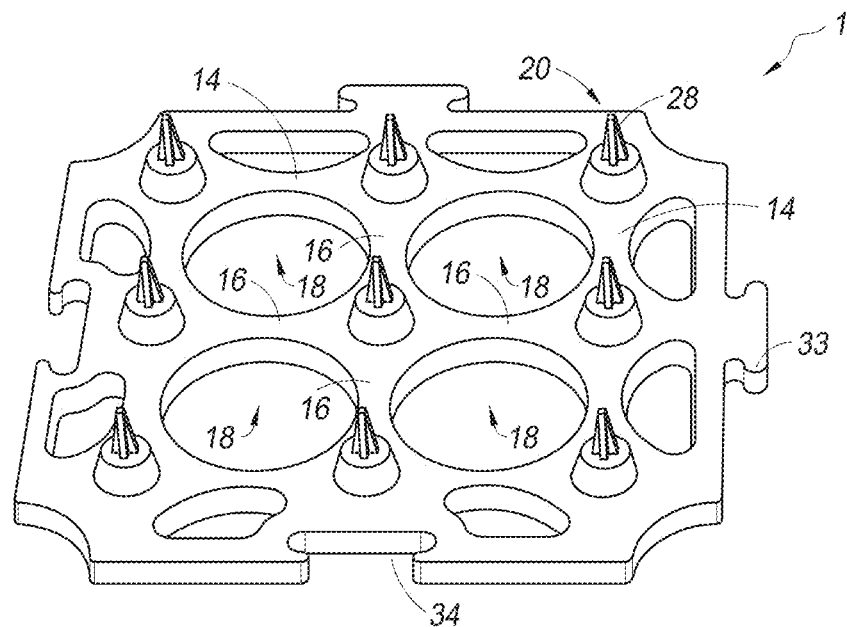
FIGS. 4A and 4B are perspective views of a top side and a bottom side, respectively, of another example apparatus in accordance with certain embodiments described herein.
Figure 4B:
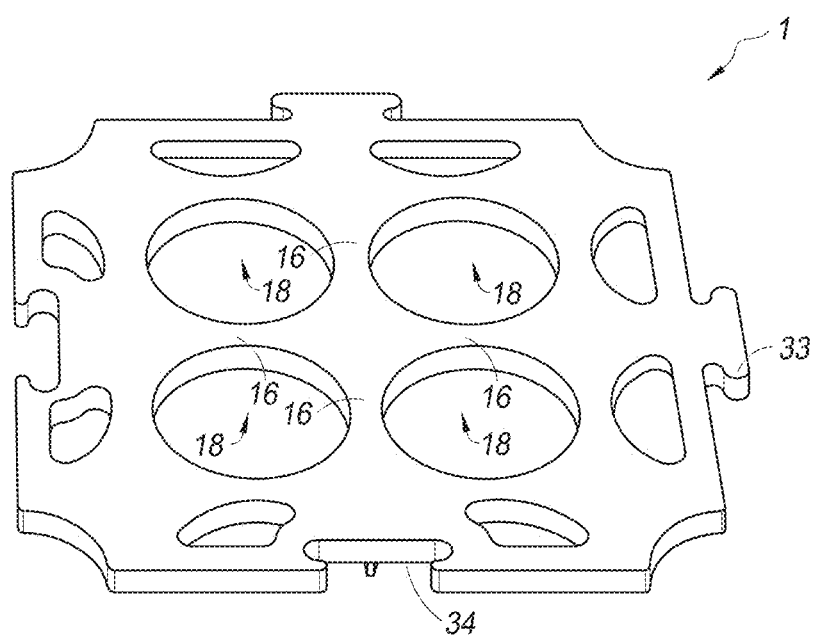
Figure 4C:
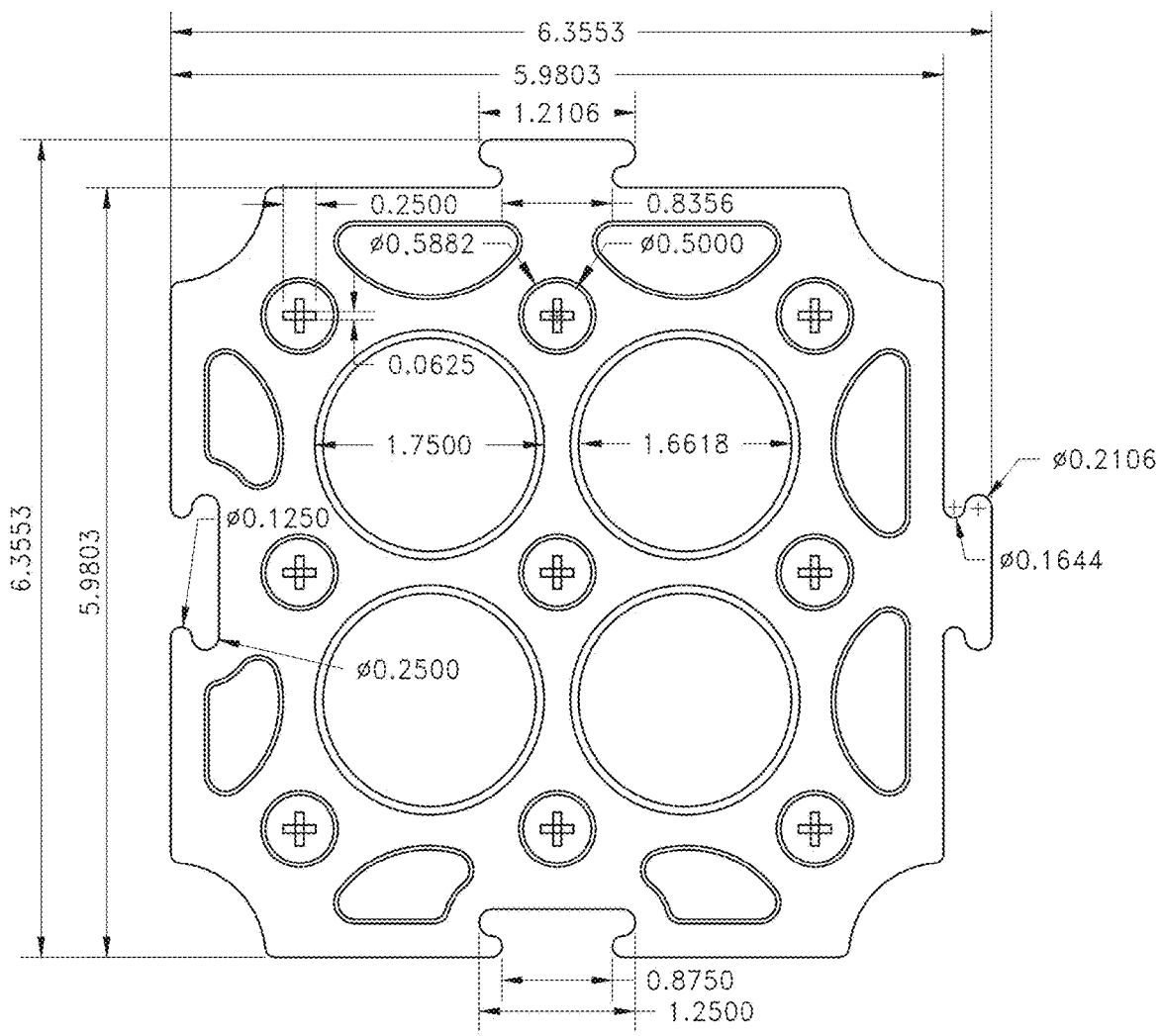
FIGS. 4C and 4D are a top view and a side view, respectively, of the example apparatus of FIGS. 4A and 4B.
Figure 4D:
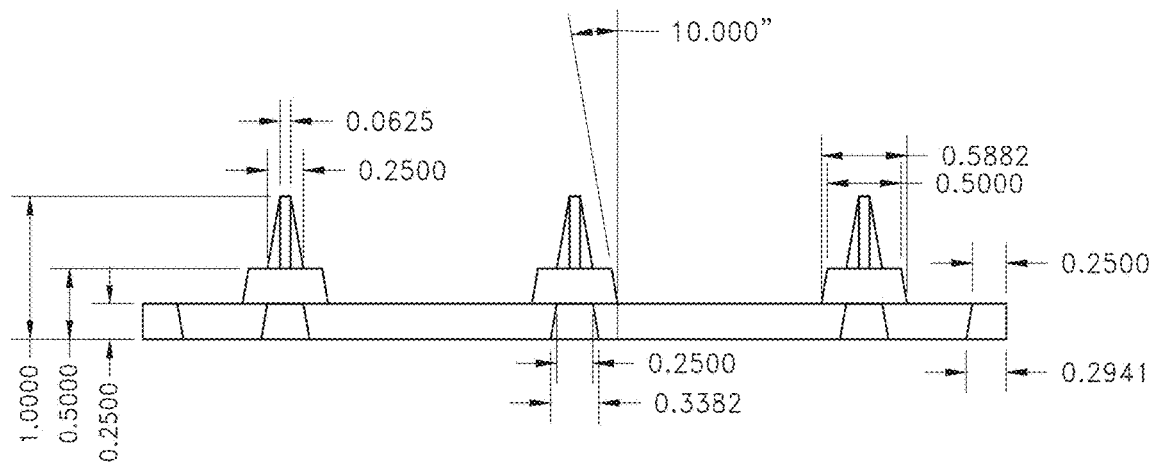

FIGS. 4A and 4B are perspective views of a top side and a bottom side, respectively, of another example apparatus 1 in accordance with certain embodiments described herein, and FIGS. 4C and 4D are a top view and a side view, respectively, of the example apparatus 1 of FIGS. 4A and 4B, with example dimensions labeled in inches. The example apparatus 1 of FIGS. 4A-4D has cross-shaped insertion anchors 28 and aeration portions 20 spaced from one another by connecting members 14, 16 which define openings 18. However, unlike the example apparatus 1 of FIGS. 1A-1D and 2A-2B, the example apparatus 1 of FIGS. 4A-4D does not include the regions 32.

Figure 5:
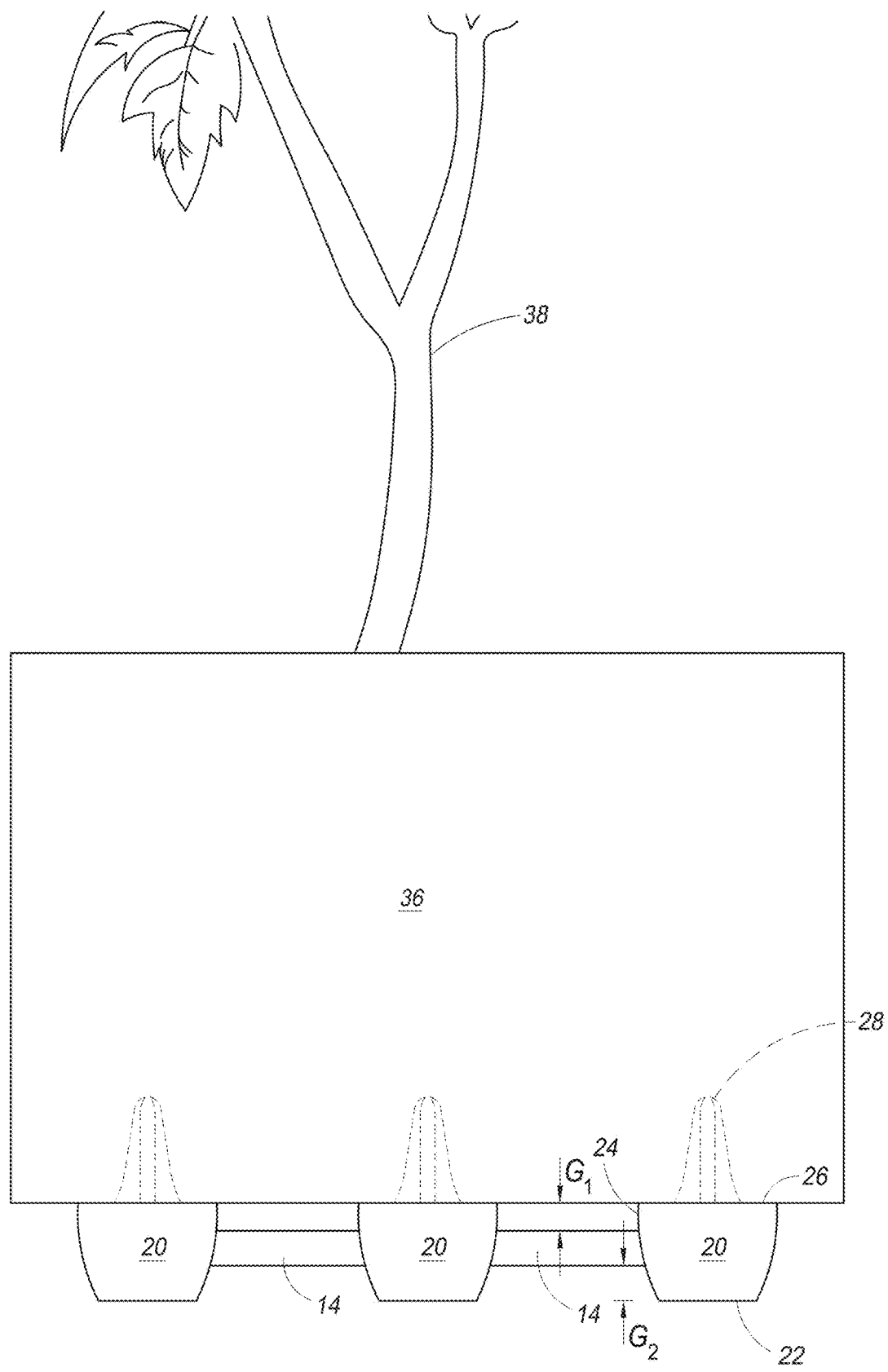
FIG. 5 is a side view of an example growth substrate (with an example plant) installed on an example apparatus in accordance with certain embodiments described herein.

FIG. 5 is a side view of an example growth substrate 36 (with an example plant 38) installed on an example apparatus 1 in accordance with certain embodiments described herein. The insertion anchors 28 of FIG. 5 are inserted into the bottom side of the growth substrate 36, thereby mechanically coupling (e.g., anchoring) the apparatus 1 to the growth substrate 36. In certain embodiments, the connecting members 14, 16 extend from the aeration portions 20 in directions generally perpendicular to the height of the sidewall portion 24 and at substantially the same position of the sidewall portion 24 along the height of the sidewall portion 24. For example, as schematically illustrated by FIG. 5, the top portion 26 and the at least one insertion anchor 28 of each aeration portion 20 are spaced from (e.g., positioned above) each of the connecting members 14, 16 by a first gap distance $G_1$ in a direction generally perpendicular to the connection members 14, 16. For example, the first gap distance $G_1$ can be in a range of 0.0625 inch to 1 inch, in a range of 0.125 inch to 0.5 inch, or in a range of 0.25 inch to 0.5 inch. In certain such embodiments, when a growth substrate 36 is seated on the insertion anchors 28 of the apparatus 1 (e.g., with the insertion anchors 28 fully inserted into the bottom side of the growth substrate 36), the bottom side of the growth substrate 36 is mechanically coupled to (e.g., rests on) the top portion 26 of each aeration portion 20 and is spaced away from the connection members 14, 16, as schematically illustrated by FIG. 5. In this way, certain such embodiments avoid contact of the growth substrate 36 with the connection members 14, 16 such that the connection members 14, 16 do not inhibit (e.g., do not prevent) oxygen from reaching roots at the bottom side of the growth substrate 36. The roots reaching the bottom side of the growth substrate 36 directly above the connection members 14, 16 are thus aerated, improving growing conditions for the plant 38 as compared to configurations in which the roots encounter (e.g., contact) a non-porous or other surface that blocks oxygen exchange.

Figure 6:
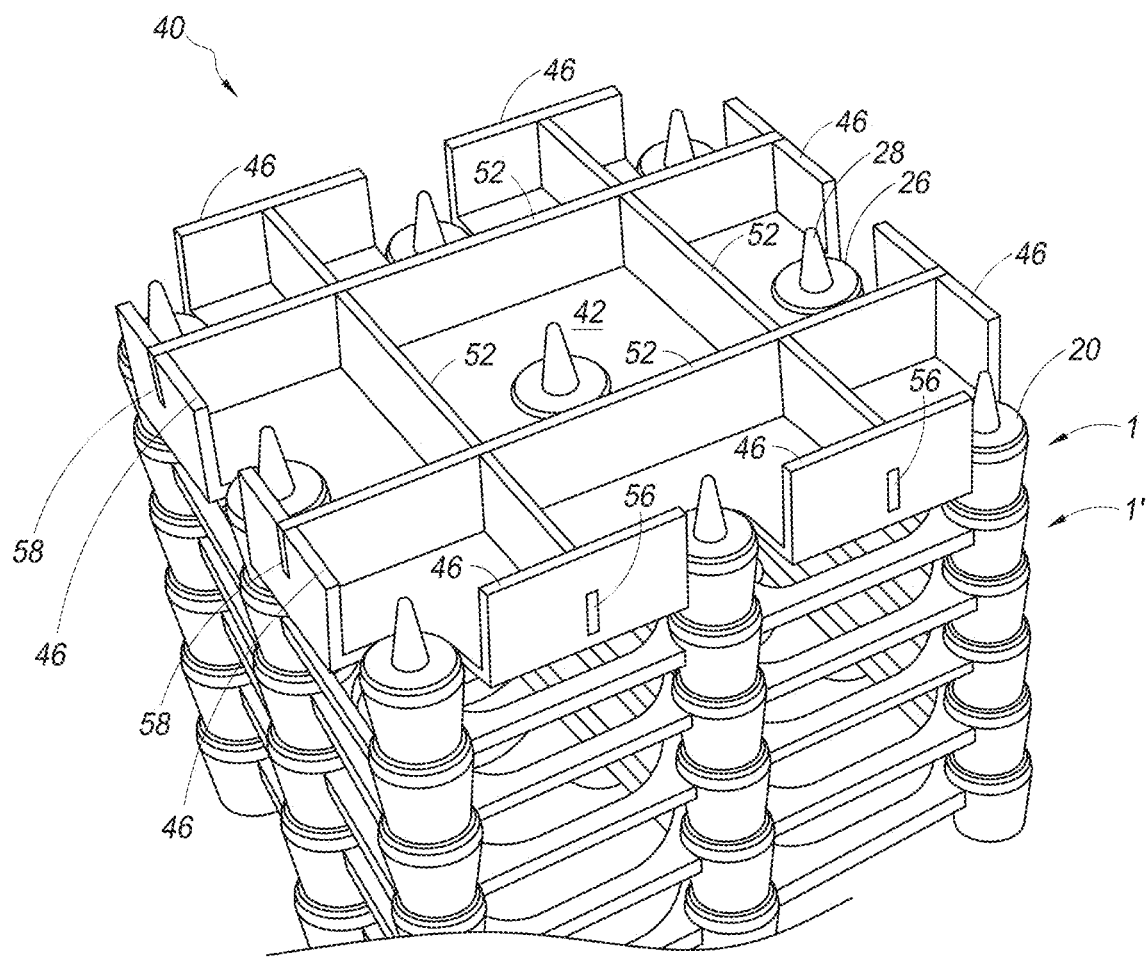
FIG. 6 is a perspective view of several example apparatuses of FIGS. 1A and 1B stacked vertically with one another in accordance with certain embodiments described herein and with an example packaging element in accordance with certain embodiments described herein.

Certain embodiments described herein advantageously have the at least one region 32 configured to receive the at least one insertion anchor 28 to facilitate stacking of multiple apparatuses 1 (e.g., for shipping; for storage) with the apparatuses 1, 1' aligned with one another. FIG. 6 is a perspective view of several example apparatuses 1, 1', etc. stacked vertically with one another (e.g., for packaging in preparation of shipping and/or storage) in accordance with certain embodiments described herein. The ability to stack multiple apparatuses 1, 1', etc. (e.g., having the insertion anchors 28 from one apparatus 1' rest within the concave recess 32 of an apparatus 1 stacked above it) allows a manufacturer to ship multiple apparatuses 1, 1', etc. in a single package while reducing (e.g., minimizing) the space used for storing the stacked apparatuses 1, 1', etc.

Figure 7:
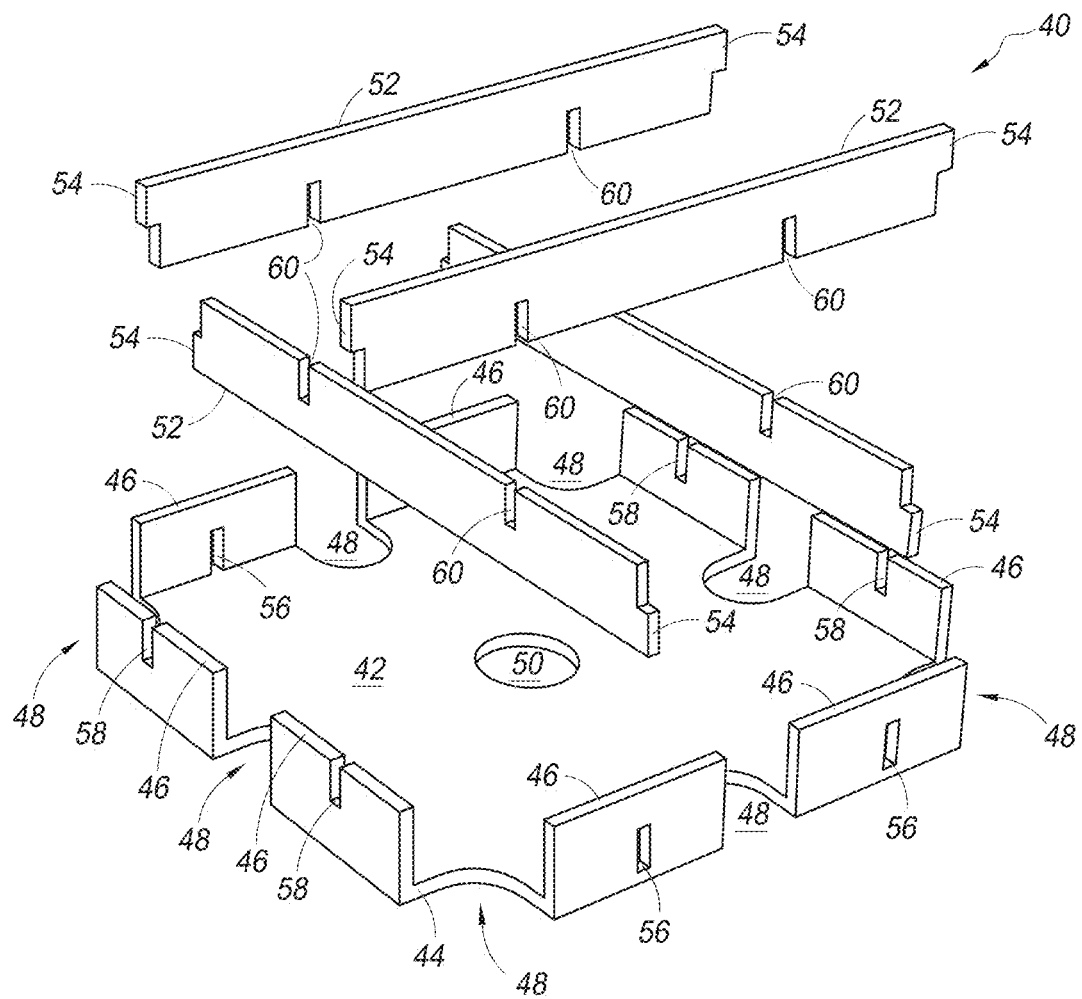
FIG. 7 is an exploded view of the example packaging element of FIG. 6 in accordance with certain embodiments described herein.

FIG. 6 also shows an example packaging element 40 in accordance with certain embodiments described herein, and FIG. 7 shows an exploded view of the example packaging element 40 of FIG. 6. The packaging element 40 of certain embodiments is configured to facilitate shipping and/or storage of a stack of multiple apparatuses 1, 1', etc. (e.g., the example packaging element 40 of FIG. 6 is configured to be positioned over a topmost apparatus 1 of the stack).

In certain embodiments, the packaging element 40 comprises a base 42 having a bottom wall 44 and a plurality of side walls 46. The bottom wall 44 of certain embodiments is configured to allow the top portions 26 and insertion anchors 28 of the topmost apparatus 1 to protrude therethrough. For example, the bottom wall 44 of certain embodiments comprises one or more open regions 48 (e.g., one or more cut-outs each having a semi-circular or quarter-circular shape) adjacent to the side walls 46 and positioned such that at least some (e.g., at least one; a plurality) of the insertion anchors 28 (e.g., at least some of the top portions 26 and insertion anchors 28) positioned along one or more sides of the topmost frame 10 protrude therethrough. The bottom wall 44 of certain embodiments further comprises one or more open regions 50 (e.g., one or more cut-outs each having a circular shape) positioned away from the side walls 46 and positioned such that at least some (e.g., at least one; a plurality) of the insertion anchors 28 (e.g., at least some of the top portions 26 and insertion anchors 28) positioned inward from the sides of the topmost frame 10 protrude therethrough. Other shapes of the open regions 48, 50 are also compatible with certain embodiments described herein.

In certain embodiments, the packaging element 40 further comprises a plurality of support members 52 configured to be mechanically coupled to (e.g., anchored into) the base 42 (e.g., the side walls 46) and to each other. For example, as schematically illustrated in FIG. 7, the support members 52 each comprise a pair of tabs 54 at the ends of the support member 52, the tabs 54 configured to engage corresponding slots (e.g., lower slots 56 and upper slots 58) in the side walls 46 of the base 40, and support member slots 60 configured to allow the support members 52 to interlock together when mechanically coupled (e.g., locked into) the base 40. In certain embodiments, the support members 52 are configured to add resiliency to the packaging element 40. In certain embodiments, the packaging element 40 is configured to protect the consumer or other goods from harm from the insertion anchors 28 during distribution and/or display. For example, the packaging element 40 can inhibit (e.g., prevent) the insertion anchors 28 of the topmost apparatus 1 from breaking through packaging materials (e.g., plastic wrap; cardboard; other materials; not shown) when the apparatuses 1, 1', etc. are stacked (e.g., bundled) together for shipping and/or storage.

Figure 8A:
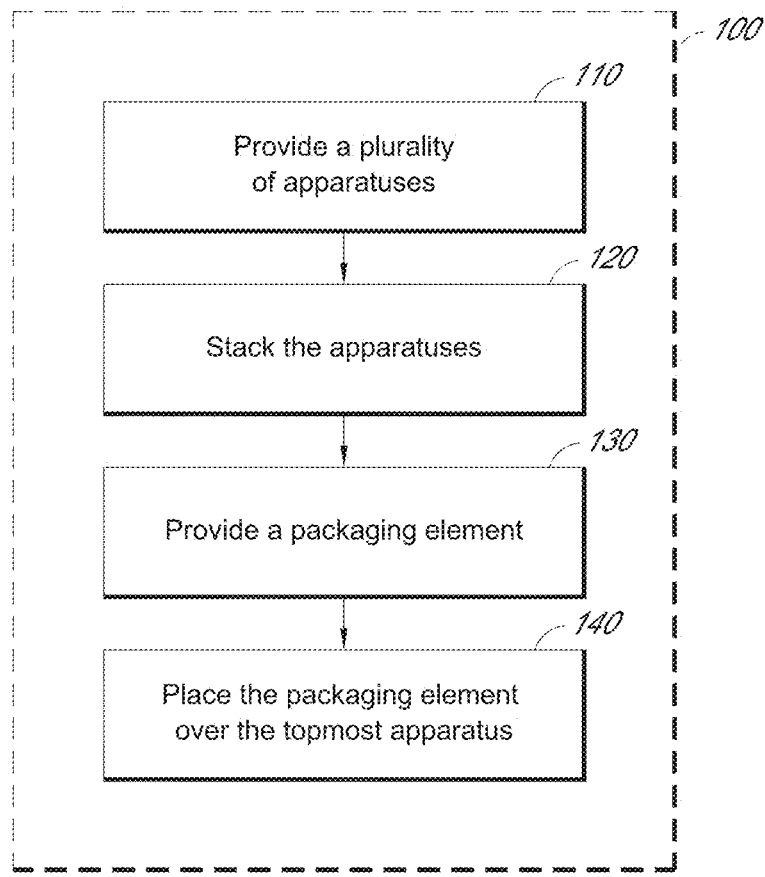
FIG. 8A is a flow diagram of an example method in accordance with certain embodiments described herein.
Figure 8B:
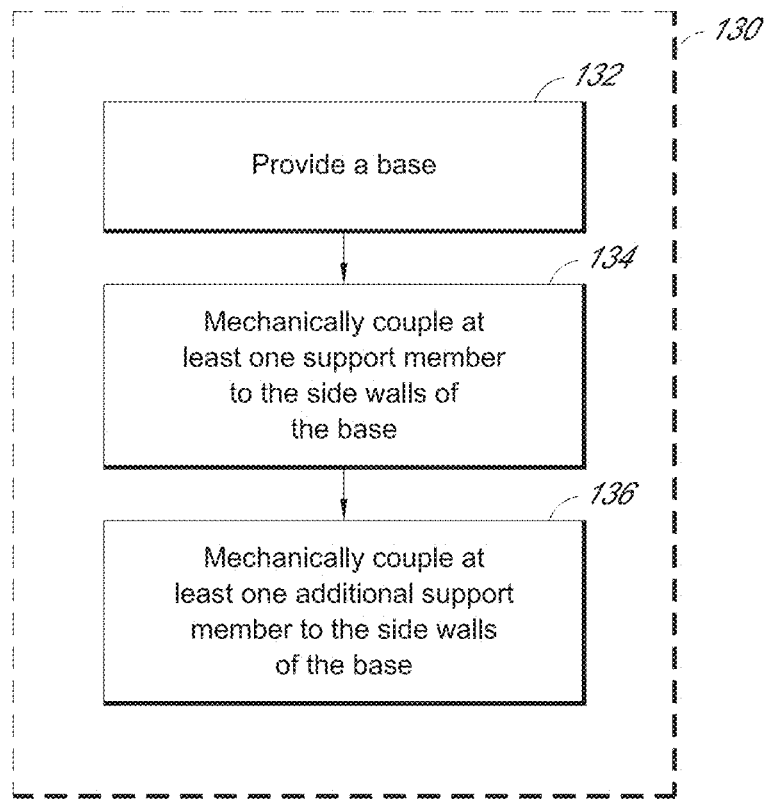
FIG. 8B is a flow diagram of an example of providing a packaging element in accordance with certain embodiments described herein.

FIG. 8A is a flow diagram of an example method 100 in accordance with certain embodiments described herein and FIG. 8B is a flow diagram of an example of the operational block 130 for providing a packaging element in accordance with certain embodiments described herein. In an operational block 110, a plurality of apparatuses 1 is provided (e.g., a first apparatus 1 and a second apparatus 1'). For example, the plurality of apparatuses 1 can be formed by injection molding or other technique, and can comprise a plurality of connecting members 14, 16 and a plurality of insertion anchors 28 (e.g., components of a plurality of aeration portions 20). In an operational block 120, the plurality of apparatuses 1 are stacked together (e.g., vertically) with the insertion anchors 28 of one apparatus 1' protruding into the recesses 32 of an overlying apparatus 1.

For example, the insertion anchors 28' of the second apparatus 1' can protrude into the recesses 32 of the first apparatus 1.

In certain such embodiments, the stacked plurality of apparatuses 1 can then be packaged for storage and/or shipping. For example, in an operational block 130, a packaging element 40 can be provided. In an operational block 140, the packaging element 40 can be placed over the topmost apparatus 1 (e.g., the first apparatus 1) of the stack of apparatuses 1 (e.g., upon stacking of a predetermined number of apparatuses 1).

In certain embodiments, the operational block 130 comprises an operational block 132 in which a base 42 of the packaging element 40 is provided and an operational block 134 in which at least one support member 52 is mechanically coupled to the side walls 46 of the base 42. For example, as schematically illustrated by FIGS. 6 and 7, two or more support members 52 can be oriented parallel to one another and anchored to the base 42 by engaging the tabs 54 of the support members 52 with the lower slots 56 of the side walls 46 and with the support members 52 having their support member slots 60 oriented away from the bottom wall 44. The operational block 130 can further comprise an operational block 136 in which at least one additional support member 52 is mechanically coupled to the side walls 46 of the base 42 with an orientation that is substantially perpendicular to the at least one support member 52 mechanically coupled to the side walls 46 of the base 42 in the operational block 134. For example, as schematically illustrated by FIGS. 6 and 7, two or more support members 52 can be oriented parallel to one another and perpendicularly to the other two or more support members 52 and anchored to the base 42 by engaging the tabs 54 of the support members 52 with the upper slots 58 of the side walls 46. The support members 52 also have their support member slots 60 oriented towards the bottom wall 44 and engaging with the support member slots 60 of the other two support members 52 (e.g., such that the two support members 52 are interlocked with the other two support members 52).

In certain embodiments, the operational block 140 comprises placing the packaging element 40 over the uppermost apparatus 1 such that the top portions 26 and insertion anchors 28 of the uppermost apparatus 1 protrude through the open regions 48, 50 of the packaging element 40 but do not extend past the side walls 46 or support members 52. For example, the open regions 48, 50 shown in FIGS. 6 and 7 can be sized such that they contact the aeration portions 20, thus mechanically coupling the packaging element 40 to the uppermost apparatus 1. In certain embodiments, the insertion anchors 28 extend above the bottom wall 44 by a first distance, and the side walls 46 and/or support members 52 extend above the bottom wall 44 by a second distance greater than the first distance (e.g., the insertion anchors 28 do not extend past the topmost edges of the side walls 46 and/or support members 52).

In certain embodiments, the apparatuses 1 can be distributed and sold according to custom, and the user can simply unwrap any packaging from the stacked apparatuses 1, can remove an apparatus 1 from the stack of apparatuses 1, and can insert the apparatus 1 into a bottom side of a growth substrate 36, with or without a plant 38 growing in the growth substrate 36. In certain embodiments, the growth substrate 36 and the apparatus 1 can then be installed in a growing system (e.g., a hydroponic growing system).

In the foregoing detailed description, reference is made to the accompanying drawings. The illustrative embodiments described herein are not meant to be limiting. Other embodiments can be utilized, and other changes can be made, without departing from the spirit or scope of the subject matter presented. It will be readily understood that the aspects of the present disclosure and illustrated in the figures, can be arranged, substituted, combined, and designed in a wide variety of different configurations by a person of ordinary skill in the art, all of which are made part of this disclosure.

Reference throughout this disclosure to "one embodiment," "an embodiment," or "in certain embodiments" means that a particular feature, structure, or characteristic described in connection with the embodiment is included in at least one embodiment. Moreover, the appearance of these or similar phrases throughout the specification does not necessarily all refer to the same embodiment, nor are separate or alternative embodiments necessarily mutually exclusive. Various features are described herein which can be exhibited by some embodiments and not by others.

Directional terms used herein (e.g., top, bottom, side, up, down, above, below, etc.) are generally used in this disclosure with reference to the orientation shown in the figures and are not intended to be limiting. For example, while some portions of the apparatus may be described as being "on the bottom" with other portions of the apparatus "above," these terms are intended to provide information regarding the relative positions of these portions to one another and do not imply any absolute orientation with respect to the environment in which the apparatus may be situated.

Unless the context clearly requires otherwise, throughout this disclosure, the words "comprise," "comprising," and the like are to be construed in an inclusive sense, as opposed to an exclusive or exhaustive sense; that is to say, in the sense of "including, but not limited to." The words "coupled" or "connected," as generally used herein, refer to two or more elements that may be either directly connected, or connected by way of one or more intermediate elements. Where the context permits, words in this disclosure using the singular or plural number may also include the plural or singular number respectively. The word "or," in reference to a list of two or more items, covers all of the following interpretations of the word: any of the items in the list, all of the items in the list, and any combination of the items in the list.

Moreover, conditional language used herein, such as, among others, "can," "could," "might," "can," "e.g.," "for example," "such as," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements, and/or states are in any way required for one or more embodiments or that one or more embodiments necessarily include logic for deciding, with or without author input or prompting, whether these features, elements, and/or states are included or are to be performed in any particular embodiment.

As used herein, a phrase referring to "at least one of" a list of items refers to any combination of those items, including single members. As an example, "at least one of A, B, or C" is intended to cover: A, B, C; A and B; A and C; B and C; and A and B and C. Conjunctive language such as the phrase "at least one of X, Y, and Z," unless specifically stated otherwise, is otherwise understood with the context as used in general to convey that an item, term, etc. may be at least one of X, Y, or Z. Thus, such conjunctive language is not generally intended to imply that certain embodiments require at least one of X, at least one of Y, and at least one of Z to each be present.

The above detailed description of embodiments is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or substrates may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

What is claimed is:

1. An apparatus configured to be mechanically coupled to at least one growth substrate, the apparatus comprising:
   a frame comprising a plurality of connecting members; and
   a plurality of insertion anchors configured to be inserted at least partially into a bottom surface of the at least one growth substrate, the insertion anchors mechanically coupled to the plurality of connecting members which form one or more openings therebetween; and one or more aeration portions, each aeration portion comprising a bottom portion, a sidewall portion, a top portion, and at least one insertion anchor of the plurality of insertion anchors, the at least on insertion anchor extending from the top portion.

2. The apparatus of claim 1, wherein the frame and the plurality of insertion anchors are components of a single, unitary structure.

3. The apparatus of claim 1, wherein the frame comprises a first plurality of elongate portions that at least partially define an outer perimeter of the apparatus and a second plurality of elongate portions that are within the outer perimeter of the apparatus.

4. The apparatus of claim 3, wherein each elongate portion of the first plurality of elongate portions and each elongate portion of the second plurality of elongate portions is connected to two corresponding insertion anchors of the plurality of insertion anchors.

5. The apparatus of claim 3, wherein each elongate portion of the first plurality of elongate portions and each elongate portion of the second plurality of elongate portions has a first end connected to a corresponding first insertion anchor of the plurality of insertion anchors and a second end connected to a corresponding second insertion anchor of the plurality of insertion anchor.

6. The apparatus of claim 1, wherein multiple insertion anchors of the plurality of insertion anchors are located along an outer perimeter of the apparatus.

7. The apparatus of claim 1, wherein the one or more openings are configured to allow oxygen to reach roots at the bottom surface of the at least one growth substrate directly above the one or more openings.

8. The apparatus of claim 1, wherein the top portion and the at least one insertion anchor are spaced from each of the connecting members in a direction generally perpendicular to the connecting members.

9. The apparatus of claim 1, wherein the bottom portion comprises at least one region configured to receive at least one insertion anchor of another apparatus stacked with the apparatus.

10. The apparatus of claim 1, wherein the bottom portion defines a bottom plane and is configured to rest on an underlying surface during use of the apparatus, and the top portion defines a top plane and is configured to support a bottom side of the growth substrate.

11. The apparatus of claim 1, wherein the at least one insertion anchor has a pointed end and one or more fins.

12. The apparatus of claim 1, wherein the frame and the plurality of insertion anchors comprise a non-porous, sterilizable material.

\* \* \* \* \*